(12) United States Patent
Leimer (10) Patent No.: US 11,364,856 B2
(45) Date of Patent: *Jun. 21, 2022

(54) PINCH-GRIP MOUNT

(71) Applicant: Handstands Promo, LLC, Salt Lake City, UT (US)

(72) Inventor: Stefan Leimer, Salt Lake City, UT (US)

(73) Assignee: Handstands Promo, LLC, Salt Lake City, UT (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/066,762

(22) Filed: Oct. 9, 2020

(65) Prior Publication Data

US 2021/0129768 A1    May 6, 2021

Related U.S. Application Data

(60) Provisional application No. 62/930,381, filed on Nov. 4, 2019.

(51) Int. Cl.
| | | |
|---|---|---|
| *B60R 11/02* | (2006.01) | |
| *H04M 1/04* | (2006.01) | |
| *B60R 11/00* | (2006.01) | |

(52) U.S. Cl.
CPC ........... *B60R 11/0241* (2013.01); *H04M 1/04* (2013.01); *B60R 2011/0008* (2013.01); *B60R 2011/0052* (2013.01); *B60R 2011/0059* (2013.01)

(58) Field of Classification Search
CPC ......... B60R 2011/0071; B60R 11/0241; B60R 2011/0008; B60R 2011/0059
See application file for complete search history.

(56) References Cited

U.S. PATENT DOCUMENTS

| | | | | | |
|---|---|---|---|---|---|
| 5,961,083 | A | * | 10/1999 | Hartmann | B60N 3/101 248/222.14 |
| 6,138,969 | A | * | 10/2000 | Olausson | B60R 11/02 224/483 |
| 9,764,693 | B1 | * | 9/2017 | Biondo | B60R 11/0241 |
| 9,821,724 | B2 | * | 11/2017 | Zhang | F16M 11/14 |
| 10,259,399 | B2 | * | 4/2019 | Yang | F16M 11/40 |
| 10,533,699 | B2 | * | 1/2020 | Yang | H04B 1/3877 |
| 10,648,493 | B1 | * | 5/2020 | Liao | F16H 19/04 |
| 11,014,509 | B2 | * | 5/2021 | Dang | B60R 11/0252 |
| 2017/0214260 | A1 | * | 7/2017 | Kim | H02J 7/0044 |

(Continued)

FOREIGN PATENT DOCUMENTS

CN          206202159 U    *  5/2017

OTHER PUBLICATIONS

English Translation of CN206202159 cited in related U.S. Appl. No. 17/066,718 (2017).*

*Primary Examiner* — Bradley Duckworth (74) *Attorney, Agent, or Firm* — Thorpe, North & Western, LLP (57) ABSTRACT

A pinch-grip mount holds a mobile device with respect to a support surface and has a pair of arms movably extending from opposite sides of a base. A pair of rollers is carried by distal ends of the pair of arms. The distal ends of the pair of arms pivot about a joint between wider and narrow positions. A pair of opposing pads is carried by distal ends of the pair of arms and have an exterior contact surface. The pair of opposing pads comprise a tacky material with the exterior contact surface being a tacky surface.

21 Claims, 11 Drawing Sheets

(56) References Cited

U.S. PATENT DOCUMENTS

2019/0241129 A1* 8/2019 Song ................ B60R 11/0241
2019/0344725 A1* 11/2019 Su .......................... H04M 1/06
2021/0309160 A1* 10/2021 Su .......................... H04M 1/04

* cited by examiner

PINCH-GRIP MOUNT

PRIORITY CLAIM

Priority is claimed to U.S. Provisional Patent Application Ser. No. 62/930,381, filed Nov. 4, 2019, which is hereby incorporated herein by reference.

BACKGROUND

Mobile devices, such as cell phones, are typically carried by a user in a vehicle. Such cell phones can be placed on seats or dashboards while driving. Movement of the vehicle can cause the cell phones to move, causing damage to the cell phone and/or distracting the driver. The development of cell phone and auto accessories is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

The terms "interference fit" and "friction fit" and "press-fit" are terms of art used interchangeably herein to refer to deliberately causing, increasing and/or using friction to deliberately resist movement. An interference fit or friction fit is different than and great than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can be created by surface roughness that is rougher.

The terms "mobile device" and "cell phone" are used interchangeably herein, unless otherwise specified, to refer to a portable handheld electronic device, such as a cellular or cell phone, tablet or tablet computer, phablet, game, GPS, and the like, with a display screen, and that is portable and handheld. The display screen can be a touch screen that can receive input by touch such as finger swipes, and/or can have a virtual keyboard. The mobile device can have a battery and memory and a processor with software running thereon. The mobile device can have cellular, WiFi and/or Bluetooth connectivity, and can have a wireless transmitter, receiver, or transceiver. Thus, the mobile device can provide internet browsing, game playing, movie and picture display, e-book display, etc. In addition, the mobile device can include a digital camera. Throughout the description, the term "cell phone" will be used as an example of the mobile device, and such use of the term "cell phone" includes all mobile devices or portable handheld electronic devices, unless otherwise specified.

The term "tacky" is used herein to refer to a non-adhesive, non-slip type cling. Such a cling can be described as mechanical and/or specific adhesion. Such a cling is without chemical adhesive that dries or cures such that the cling can be overcome by hand force without altering the surfaces.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Securing and mounting a mobile device, such as a cell phone, to a vehicle, such as an air vent or a dashboard, is provided. In one aspect, a vent clip mount is provided to engage and grip the louvers of a vehicle air vent and to receive a mobile device thereon. The vent clip mount has a flexible pad, such as an open cell foam, to abut to a front of the louvers and to span a gap between the louvers, thus locking the louvers from moving. In addition, the vent clip mount has a T-shaped twist key that extends into the air vent and between the louvers, and with a head on the distal end thereof to engage the louvers.

In another aspect, a pinch grip mount can be carried by the vent clip mount to receive and hold the mobile device. The pinch grip mount can have a pair of arms that move between a wider and narrow position to expand to receive the mobile device and collapse to grip the mobile device. A pair of opposing pads can be carried by the pair of arms. The pair of pads can have a tacky surface to grip the mobile device.

In another aspect, the pinch grip mount can be carried by a dash mount. The dash mount can have a flexible pad with a tacky bottom to cling to the dashboard or console of the vehicle. In addition, the dash mount can have a deformable member that can retain its shape to conform to the dashboard or console and to maintain the tacky bottom of the flexible pad in contact with the dashboard or console.

Figure 1:
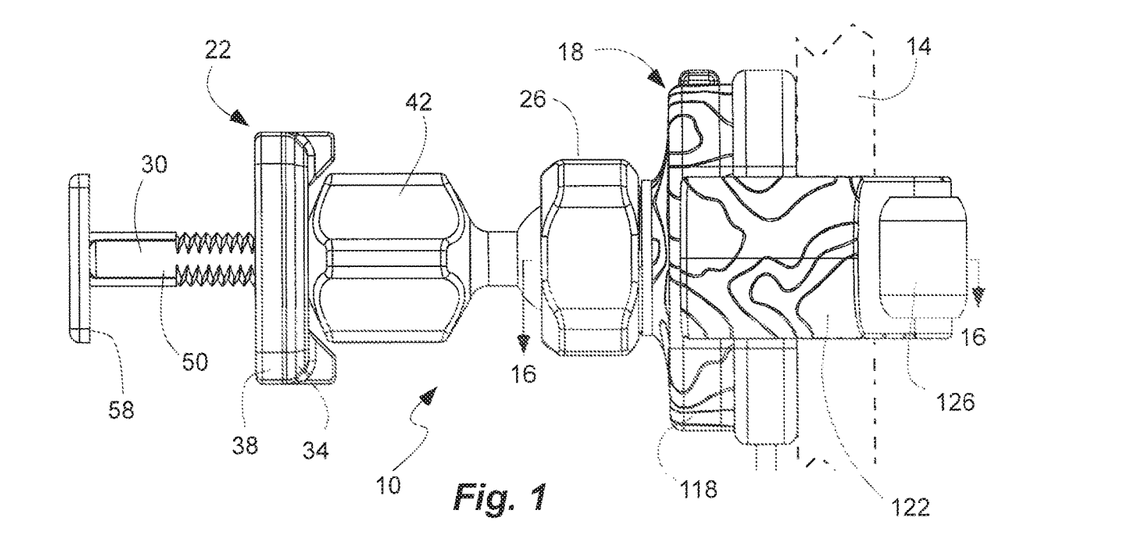
FIG. 1 is a side view of a vent clip mount and a pinch grip mount in accordance with an embodiment of the invention.
Figure 2:
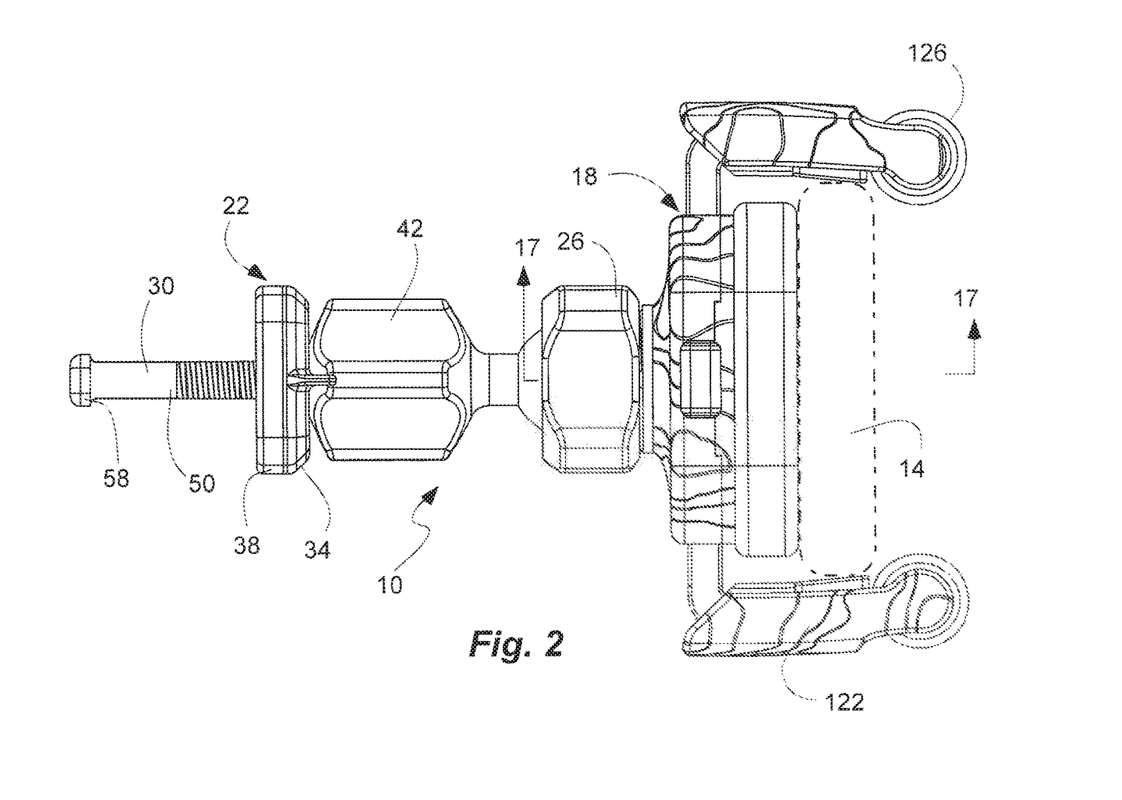
FIG. 2 is a top view of the vent clip mount and the pinch grip mount of FIG. 1.

Referring to FIGS. 1 and 2 a mounting system 10 is shown for mounting a mobile device 14, such as a cell phone, to a vehicle. The mounting system 10 can comprise a pinch clip mount 18 carried by and mounted to a vent clip mount 22. The pinch clip mount 18 can grip and hold the mobile device 14 while the vent clip mount 22 can be coupled to the vehicle, thus securing and mounting the mobile device 14 to the vehicle. The pinch clip mount 18 can be mounted to the vent clip mount 22 with an articulated joint, such as a ball and socket joint 26, so that the pinch clip mount 18 and the vent clip mount 22 can be selectively oriented with respect to one another about the joint 26. In addition, the pinch clip mount 18 can be removable coupled to the vent clip mount 22. A nut of the ball and socket joint 26 can be selectively loosened and tightened. Some or all of the components of the mounts 18 and 22 can be formed of plastic and can be formed by injection molding.

Figure 3:
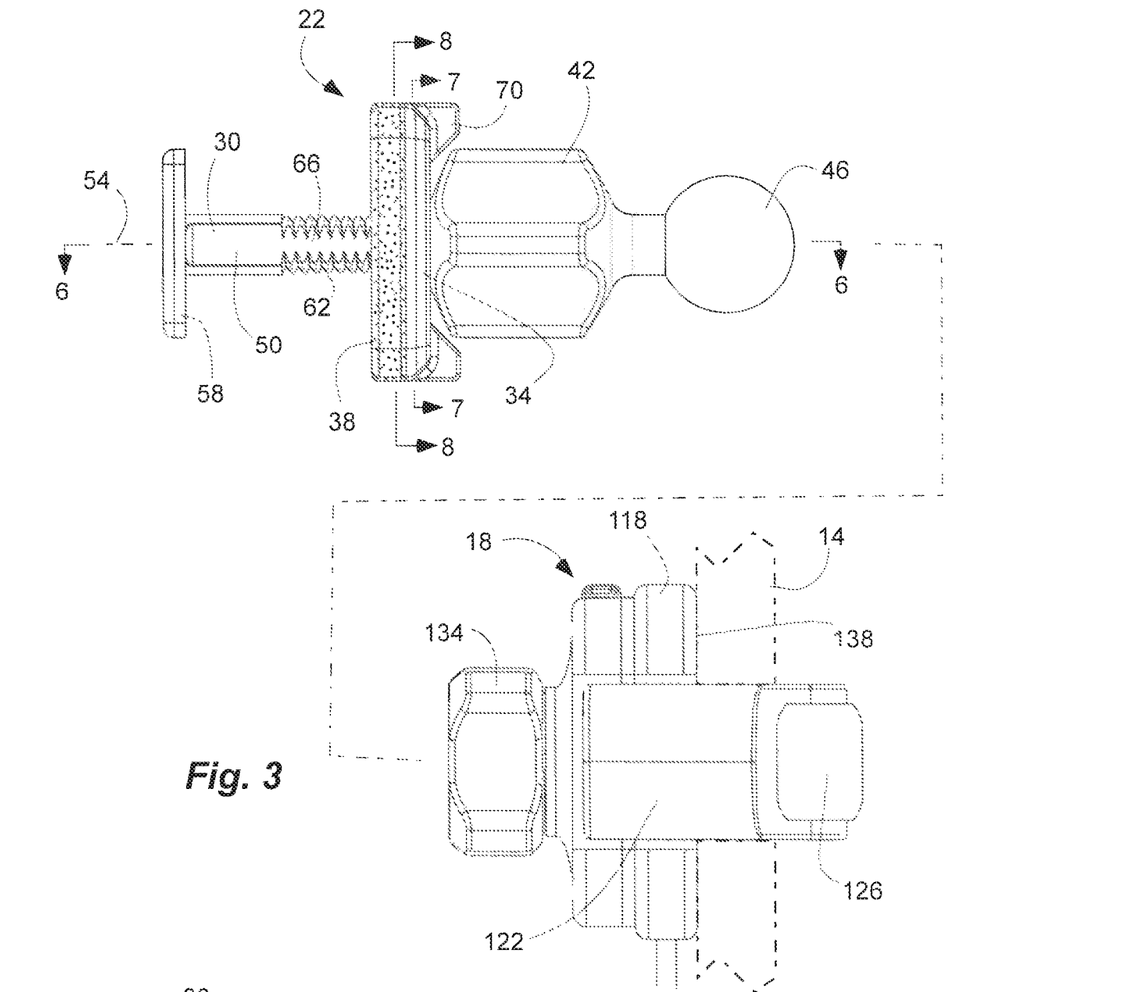
FIG. 3 is a side exploded view of view of the vent clip mount and the pinch grip mount of FIG. 1.
Figure 5:
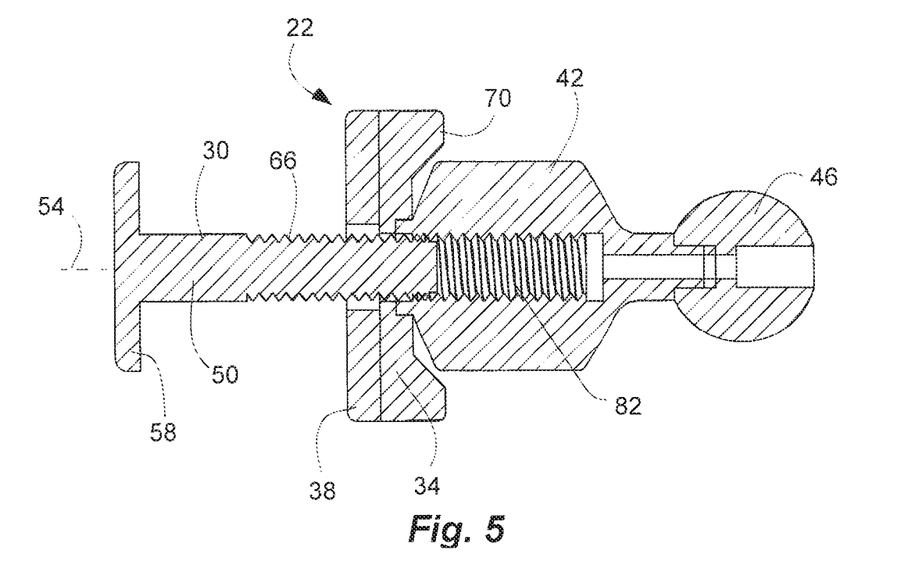
FIG. 5 is a cross-sectional side view of the vent clip mount of FIG. 1.
Figure 6:
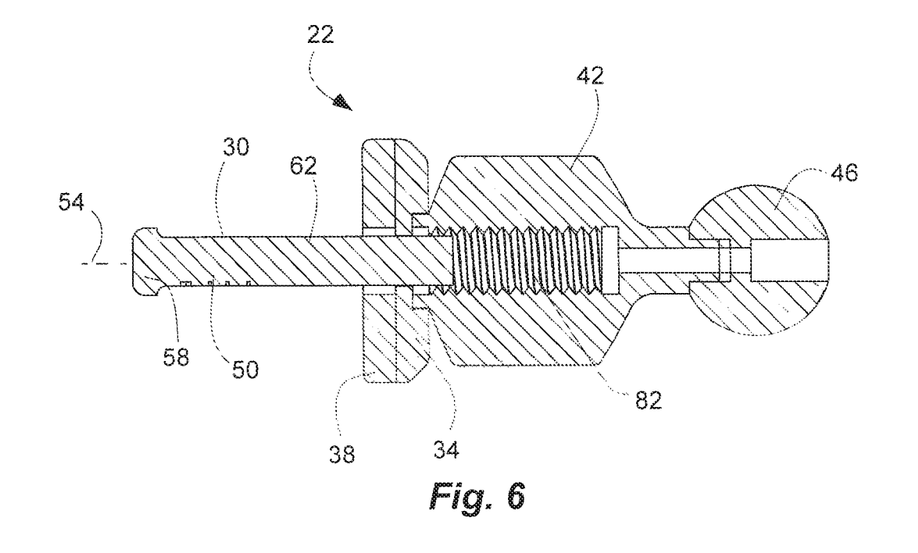
FIG. 6 is a cross-sectional top view of the vent clip mount of FIG. 1.

Referring to FIGS. 3, 5 and 6, the vent clip mount 22 can comprise at least one twist key 30, an intermediate plate 34 with a pad 38, a nut 42 and a support 46. The twist key 30 can have a T-shape with a shaft 50 having distal and proximal ends and defining an axis 54. A head 58 is carried at the distal end of the shaft 50 and the shaft 50 extends from the head 58. The head 58 has a shape with a narrow dimension and a long dimension greater than the narrow dimension and oriented transverse to the narrow dimension with both dimensions orthogonal to the axis 54 of the shaft 50. For example, the head 58 can have a rectangular shape. In one aspect, the shaft 50 has screw threads 62 and at least one flat 66 along at least one lateral side thereof. In another aspect, the shaft 50 has a pair of opposite flats 66 along opposite lateral sides of the shaft. As discussed below, the twist key 30 is selectively twistable about the axis 54 of the shaft 50 between an angle greater than zero and less than a full turn (<360 degrees) to selectively orient the head 58. The head 58 can be selectively oriented between: 1) a pass orientation to be received between louvres of the air vent; and 2) a lock orientation transverse to the pass orientation and to be misaligned with respect to the louvres.

The intermediate plate 34 is carried by the shaft 50 and the twist key 30, and selectively displaceable and movable along the shaft 50 and the axis 54 towards the head 58 of the twist key 30. As described in greater detail below, the twist key 30 and the intermediate plate 34 can be keyed so that they can turn together about the axis 54. In one aspect, the intermediate plate 34 can have at least one tab 70 extending from the plate 34 opposite the head 58 and aligned with the long dimension of the head 58. In another aspect, the intermediate plate 34 can have a pair of tabs 70. The tab(s) 70 can define an indicator of the orientation of the head 58.

Figure 7:
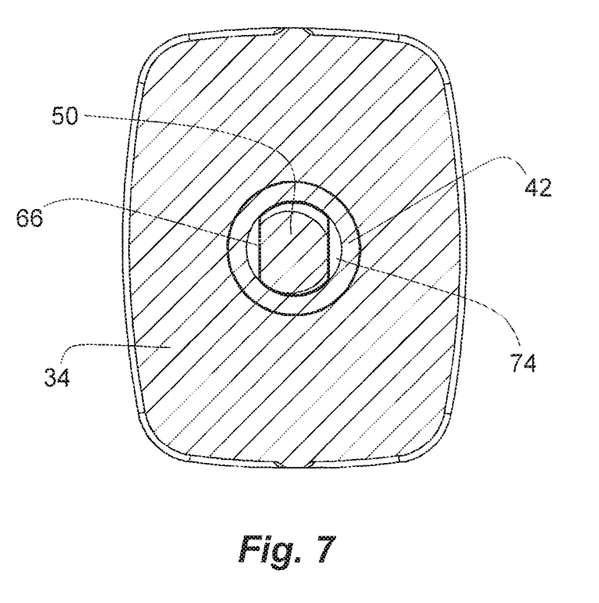
FIG. 7 is a cross-sectional end view of the vent clip mount of FIG. 1 taken along line 7 of FIG. 3.
Figure 8:
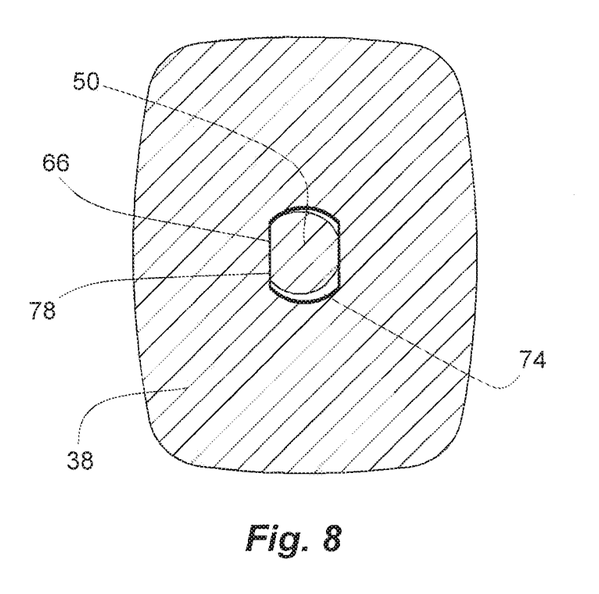
FIG. 8 is a cross-sectional end view of the vent clip mount of FIG. 1 taken along line 8 of FIG. 3.

Referring to FIGS. 7 and 8, the intermediate plate 34 can have an aperture 74 receiving the shaft 50 therethrough. In one aspect, the aperture 74 can have at least one flat 78 (FIG. 8) therein engaging the flat 66 of the shaft 50. In another aspect, the aperture 74 can have a pair of opposing flats 78. Thus, the plate 34 is displaceable and movable along the shaft 50 and the axis 54 without rotating thereon.

Referring again to FIGS. 3, 5 and 6, the pad 38 can be carried by the intermediate plate 34 and can oppose the head 58. The pad 38 and the intermediate plate 34 have: 1) a loose position further from the head 58, and 2) a tight position closer to the head 58. In one aspect, the pad 38 can be flexible and compressible and thus capable of having an induced indentation therein via the louvres in the tight position. Thus, the louvers can nest within the indentations of the pad 38 to resist the louvers from turning under the weight of the mount system 10 and the mobile device 14, to secure the position of the mount system 10 and the mobile device 14. The pad 38 can also have an aperture receiving the shaft and can also have a flat.

The nut 42 is carried by the shaft 50 and has a bore with screws threads 82 engaging the screw threads 62 of the shaft 50. The nut 42 is rotatable about the shaft 50 and the axis 54 to displaceable and move along the shaft 50 as it rotates. As the nut 42 rotates, it advances the plate 34 and the pad 38 along the shaft 50. Eventually, the nut 42 will press the pad 38 against and the louvres of the vehicle vent.

Referring to FIG. 7, the plate 34 and the nut 42 are separate and distinct from one another and movable with respect to one another. Both the plate 34 and the nut 42 can advance along the shaft 50, but the nut 42 can rotate on the shaft 50. In one aspect, the plate 34 can have an annular or circular recess circumscribing the aperture 74 and the nut 42 can have an annular or circular protrusion received and rotatable in the annular recess.

Referring again to FIGS. 3, 5 and 6, the support 46 is carried by the shaft 50 and the twist key 30, and located at the proximal end of the shaft 50 and the twist key 30. In one aspect, the support 46 can comprise one part of the ball-and-socket joint 26, such as the ball.

Referring to FIGS. 9-12, the vent clip mount 22 is shown engaging louvres 86 of a vehicle air vent 90, and demonstrates a method of using the vent clip mount 22 and securing the mobile device 10 and the pinch clip mount 18 with respect to the louvres 86 and the vehicle. The vehicle air vent 90 can have an interior 94 and at least two adjacent louvres 86 spanning an opening of the vent 90 and spaced-apart by a gap 98.

Figure 9:
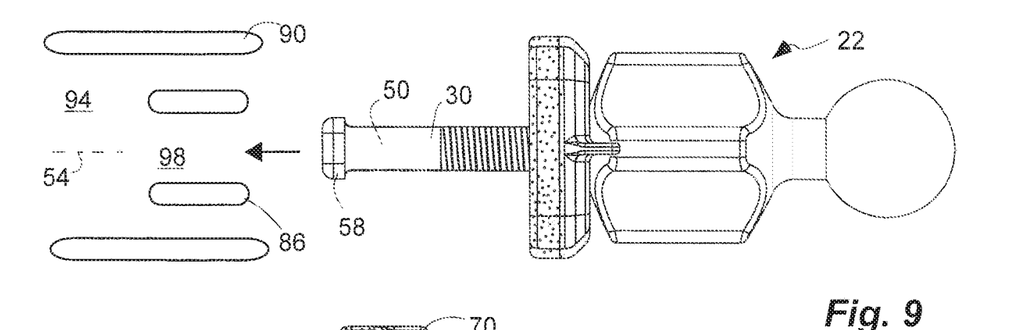
FIG. 9 is a schematic side view of the vent clip mount of FIG. 1 shown outside a vehicle air vent, and with the twist key in a pass orientation.

Referring to FIG. 9, the head 58 of the twist key 30 is aligned with the gap 98 and inserted through the gap 98 between two adjacent louvres 86 and into the interior 94 of the air vent 90. Thus, the twist key 30, the shaft 50 and the head 58 are oriented in the pass orientation to be received between the louvres 86.

Figure 10:
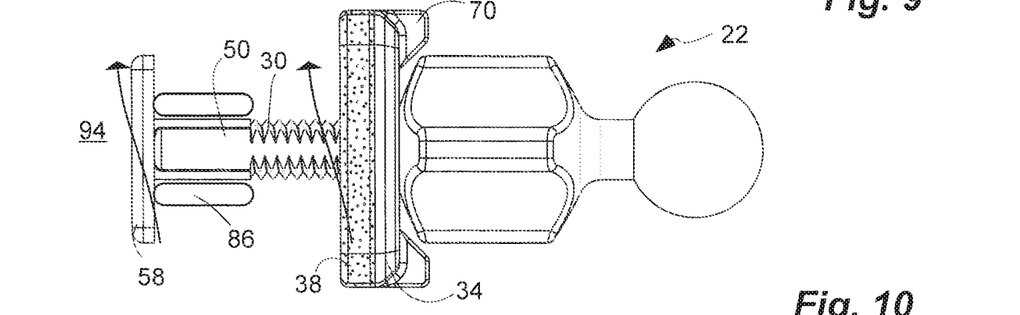
FIG. 10 is a schematic side view of the vent clip mount of FIG. 1 shown inserted into the vehicle air vent, and with the twist key in a lock orientation, and with the pad in a loose position.

Referring to FIG. 10, the twist key 30 and the shaft 50 are twisted so that the head 58 is oriented transvers to the gap 98 and the two adjacent louvres 86. In one aspect, the twist key 30 and the shaft 50 can be twisted using the plate 34 and the tabs 70 thereon. In addition, the tabs 70 can indicate the orientation of the head 58 within the interior 94 of the air vent 90 and behind the louvres 86. The twist key 30, the shaft 50 and the head 58 are oriented in the lock orientation transvers to the pass orientation and misaligned with respect to the louvres 86. In one aspect, the twist key 30, the shaft 50, the plate 34 and the tabs 70 can be twisted and pivoted approximately 90 degrees and perpendicular to the pass orientation. In another aspect, the twist key 30, the shaft 50, the plate 34 and the tabs 70 can be being selectively twistable about the axis 54 of the shaft 50 between an angle greater than zero and less than a full turn (e.g. 360 degrees) to selectively orient the head 58 between the pass and lock orientations.

In use, the head 58 is located in the interior 94 of the air vent 90, oriented transvers with respect to the gap 98 and the louvres 86, spans the gap 98 and abuts to the adjacent louvres 86. In one aspect, the head 58 spans the adjacent louvers 86. In another aspect, the head 58 can span and abut to more than two louvers 86, for example three or four louvres. In addition, at least a portion of the shaft 50 is positioned in the gap 98 and between the two adjacent louvres 86.

Figure 11:
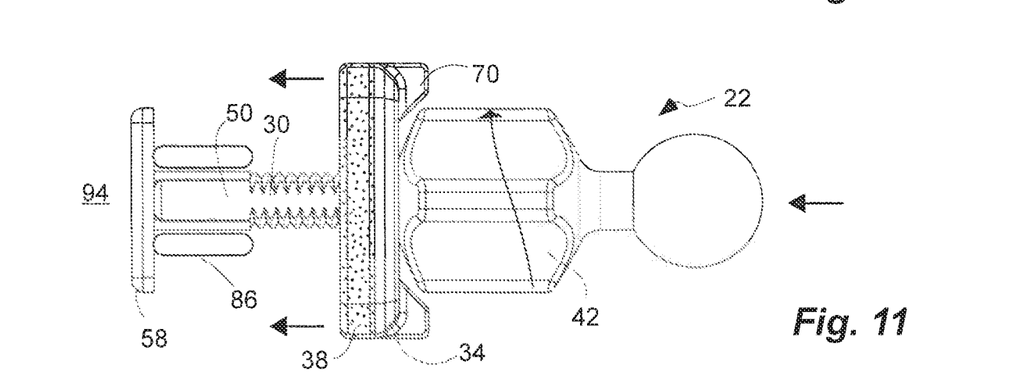
FIG. 11 is a schematic side view of the vent clip mount of FIG. 1 shown inserted into the vehicle air vent, and with the twist key in the lock orientation, and with the pad in the loose position.

Referring to FIG. 11, the plate 34 and the pad 38 are displaced axially along the shaft 50 towards the head 58 and the louvres 86. The nut 42 is rotatable about the shaft 50 to displace along the shaft as is rotates. Thus, the nut 50 advances the plate 34 and the pad 38 along the shaft 50 to press the pad 38 against the louvres 86. The plate 34, the pad 38 and the nut 42 have a loose position further from the head 58, as shown in FIGS. 10 and 11, and a tight position closer to the head as shown in FIG. 12.

Figure 12:
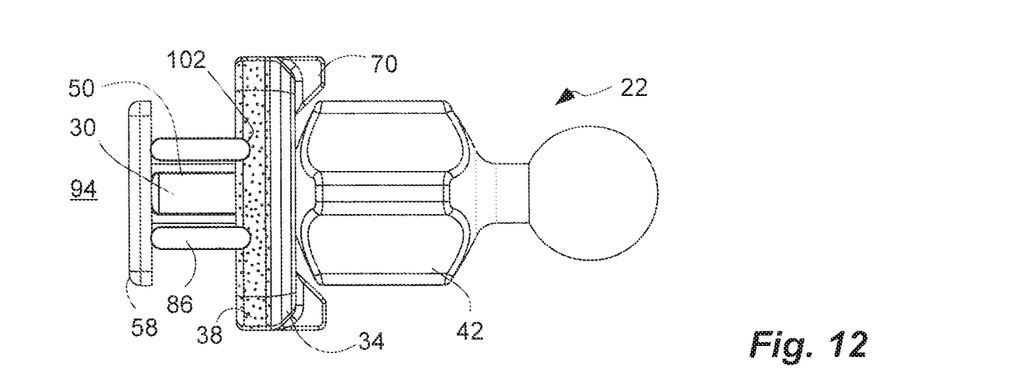
FIG. 12 is a schematic side view of the vent clip mount of FIG. 1 shown inserted into the vehicle air vent, and with the twist key in the lock orientation, and with the pad in a tight position.

Referring to FIG. 12, the plate 34, the pad 38 and the nut 42 are advanced along the twist key 30 and the shaft 50 to compress the pad 38 against a front of the louvers 86 while the head 58 abuts a rear of the louvers 86. The pad 38 is located outside the louvers 86 and against the front of the adjacent louvres 86. In one aspect, the pad 38 spans the gap 98 and abuts to at least two adjacent louvres 86. Thus, the pad 38 and the head 58 squeeze the two adjacent louvres 86 therebetween. In another aspect, the pad 38 can span and abut to more than two louvers 86, for example three or four louvres. The pad 38 is compressible and capable of having induced indentations 102 therein via the louvres 86 in the tight position. Thus, the indentations 102 are formed in the pad 38 by the louvers 86. The pad 38 can surround a front of the louvers 86 and retain the front of the louvers 86 in the indentations 102 to resist the louvers from pivoting, and thus hold the louvres 86 in a fixed position. A straight line distance, parallel with the axis 54, between the head 58 and the pad 38 can vary across the pad 38.

Figure 4:
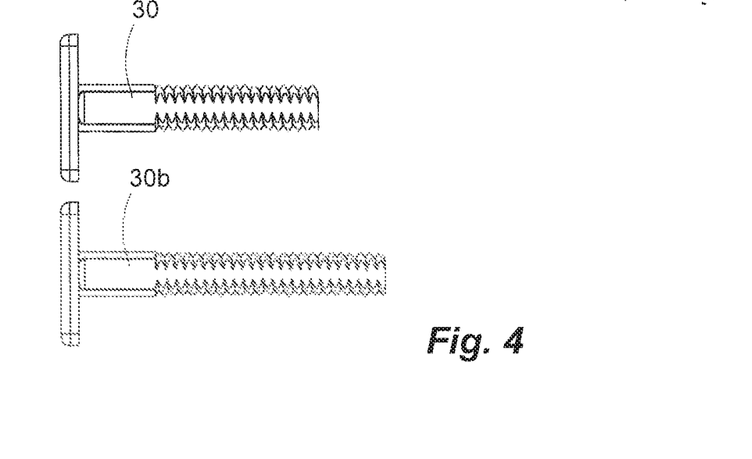
FIG. 4 is a side view of a pair of T-shaped twist keys of the vent clip mount of FIG. 1.

Referring to FIG. 4, the vent clip mount 22 can be provided with at least two different interchangeable twist keys 30 and 30b. The twist keys 30 and 30b have shanks with different lengths. One twist key 30 can have a shank that is shorter and used with smaller air vents and shallower louvers, while another twist key 30b can have a shank that is longer and used with larger air vents and deeper louvers.

Figures 13, 14, 15:
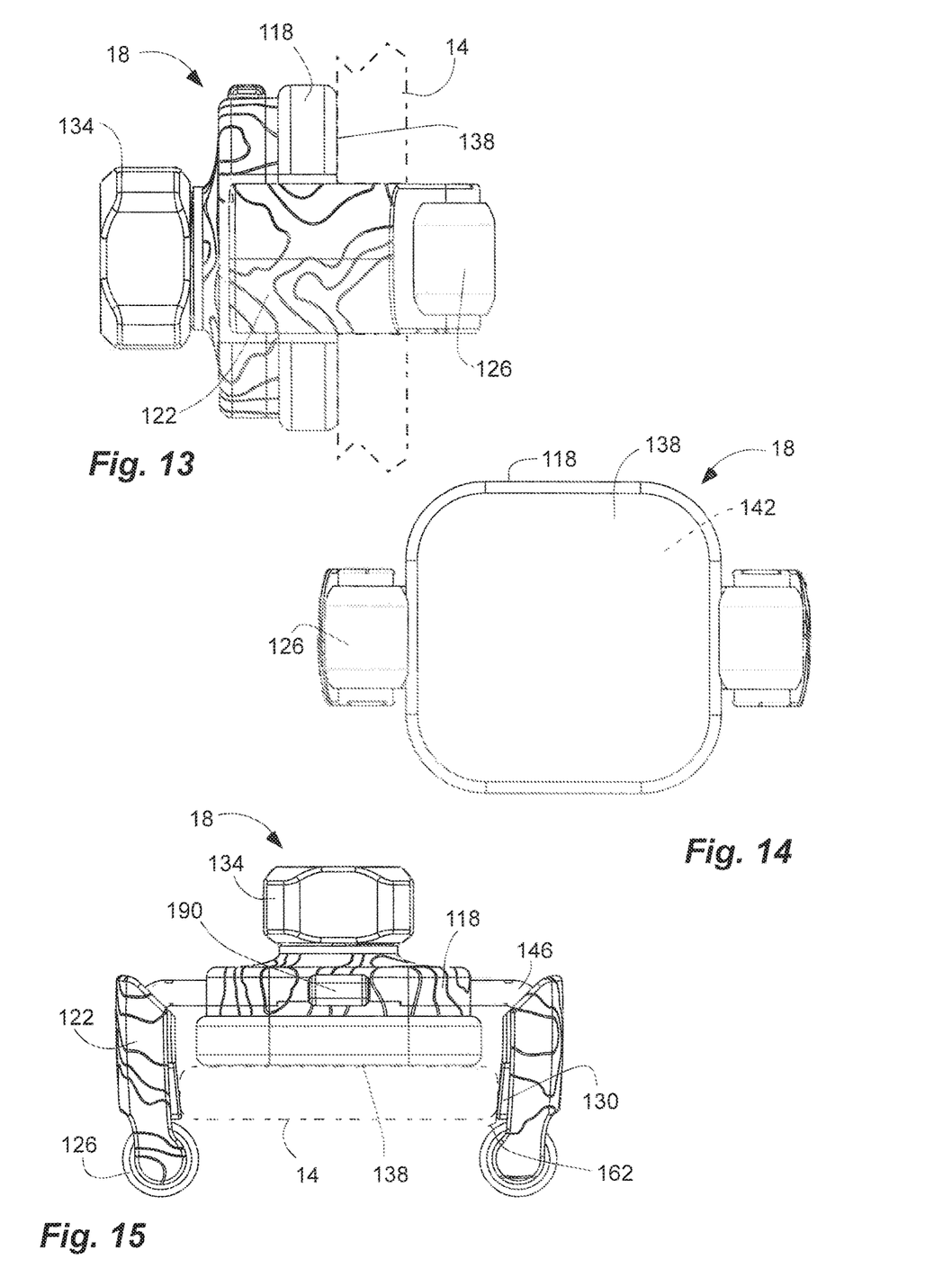
FIG. 13 is a side view of the pinch grip mount of FIG. 1.
FIG. 14 is a front end view of the pinch grip mount of FIG. 1.
FIG. 15 is a top view of the pinch grip mount of FIG. 1.
Figures 16, 17, 18:
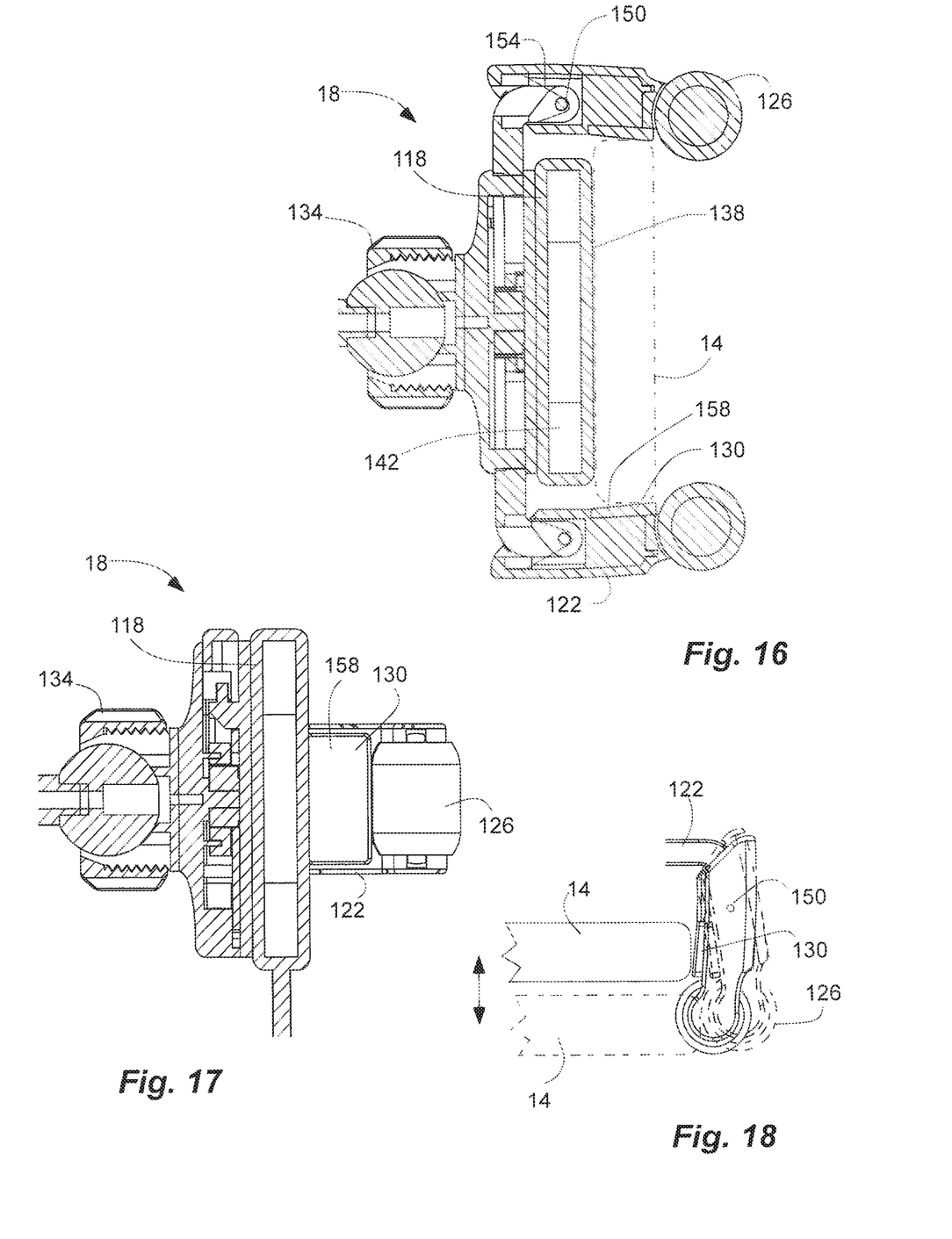
FIG. 16 is a cross-sectional top view of the pinch grip mount of FIG. 1 taken along line 16 in FIG. 1.
FIG. 17 is a cross-sectional side view of the pinch grip mount of FIG. 1 taken along line 17 of FIG. 2.
FIG. 18 is a partial detailed top view of an arm of the pinch grip mount of FIG. 1 shown pivoting between a wider position in phantom lines and a narrow position in solid lines.

Referring to FIGS. 3 and 13-18, the pinch grip mount 18 can comprise a base 118 and back plate, a pair of arms 122, a pair of rollers 126 and a pair of pads 130 (FIGS. 15 and 17). In addition, the pinch grip mount 18 can have a support 134 carried by the base 118 to be coupled to the support 46 (FIG. 3) of the vent clip mount 22. In one aspect, the support 134 can comprise one part of the ball-and-socket joint 26, such as the socket. The pinch grip mount 18 receives and holds the mobile device 14, as shown in FIGS. 1 and 2, with respect to a support surface, such as the vehicle air vent 90 or the dash or consul of the vehicle. In one aspect, the base 118 and the pair of arms 122 can be formed of plastic and can be formed by injection molding. The pair of rollers 126 can comprise a flexible and resilient material, such as rubber.

The base 118 can have and can be a housing with a front face 138 against which the mobile device 14 abuts when carried by the pinch grip mount 18. In one aspect, the pinch grip mount 18 can comprise a wireless charger 142 that is carried by the base 118 and disposed therein. An electrical wire can extend from the wireless charger 142, out of the base 118, and to a vehicle power outlet. Thus, the mobile device 14 can charge while being held by the pinch grip mount 18.

The pair of arms 122 can movably extending from opposite sides of the base 118. In one aspect, the pair of arms 122 can be selectively positioned with respect to each other and the base 118 in order to match a width of the mobile device 14. In another aspect, the pair of arms 122 can be movable and pivotal inwardly and outwardly, and biased inwardly, in order to grip the mobile device 14 between the arms 122. Each arm 122 can have a proximal end extendable laterally and slidable with respect to the base 118 to be selectively positioned. In addition, each arm 122 can have a distal end extending transverse and outwardly with respect to the proximal end and the base 118 at an elbow 146.

The pair of rollers 126 can be carried by the pair of arms 122 and located at the distal ends thereof. The distal ends and the rollers 126 can be pivotal with respect to the base 118 and the proximal ends of the arms 122 to grip the mobile device 14. In one aspect, a joint 150 can be between the proximal and distal ends of each arm 122 forming and having a pivot. Thus, the distal end of the arm 122 can pivot with respect to the proximal end about the pivot of the joint 150 between a wider position and a narrow position. In the wider position, shown in phantom lines in FIG. 18, there is a greater distance between the pair of rollers 126 and the distal ends of the arms 122 to receive the mobile device 14. In the narrow position, shown in solid lines in FIG. 18, there is a shorter and narrower distance between the pair of rollers 126 and the distal ends of the arms 122 to grip the mobile device 14. In one aspect, the pivot axis of the pivot of the joint 150 can be oriented substantially parallel with a rotational axis of the rollers 126. In one aspect, a bias member 154 can bias the distal ends of the pair of arms and the pair of rollers 126 to the narrow position. The mobile device 14 can be pressed into the pinch grip mount by pressing the mobile device 14 against the rollers 126, causing the rollers 126 and the distal ends of the arms 122 to separate. Once between the pair of arms 122, the biasing member 154 closes the arms 122.

The pair of pads 130 is carried by distal ends of the pair of arms 122 and oppose one another. The pads 130 are oriented transvers with respect to the base 118 and the front face 138. The pads 130 have an exterior contact surface 158 that contact the mobile device 14. The pads 130 comprise a tacky material and the exterior contact surface 158 is tacky. Thus, in addition to gripping the mobile device between the pair of arms 122, the tacky contact surface 158 further hold the mobile device 14. In one aspect, the pinch grip mount 18 can be provided with a release liner 162 (FIG. 15) covering the exterior contact surface 158 of the pads 130. The release liner 162 protects the tacky surface 158 until use. The release liner 162 is removable before use. In one aspect, the opposing pads 130 can be compressible. Thus, the pads 130 can conform to contours of lateral sides of the mobile device 14, and can increase the surface area of the exterior contact surface 158 against the mobile device 14 to enhance grip. In another aspect, the pads 130 can be sized and shaped to maximize the exterior contact surface 158 available to contact the mobile device 14. For example, the pads 130 can extend along the distal ends of the arms 122 substantially from the rollers 126 to the base 118 and the front face 138. In addition, the pads 130 can extend substantially the height of the distal ends of the arms 122.

In another aspect, the base 118 can have a channel in a lateral side thereof to receive and hold a charging cord of the mobile device 14 when the mobile device is removed from the pinch grip mount 18.

Figure 19:
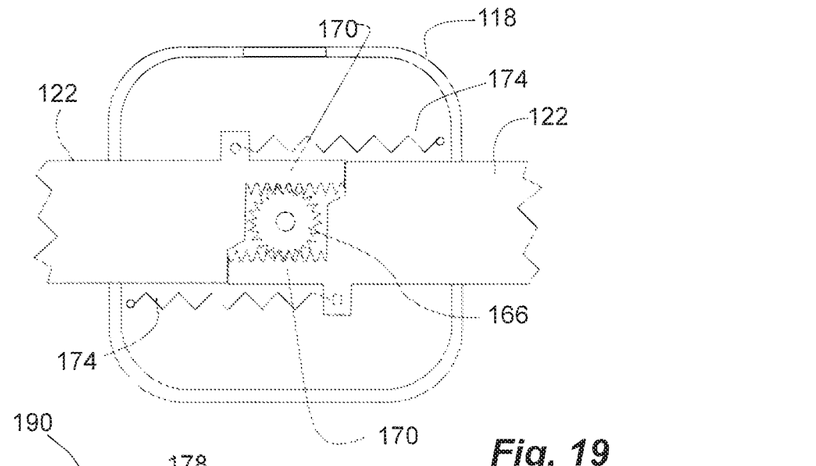
FIG. 19 is a schematic view of a rack and pinion of the pinch grip mount of FIG. 1.
Figure 20:
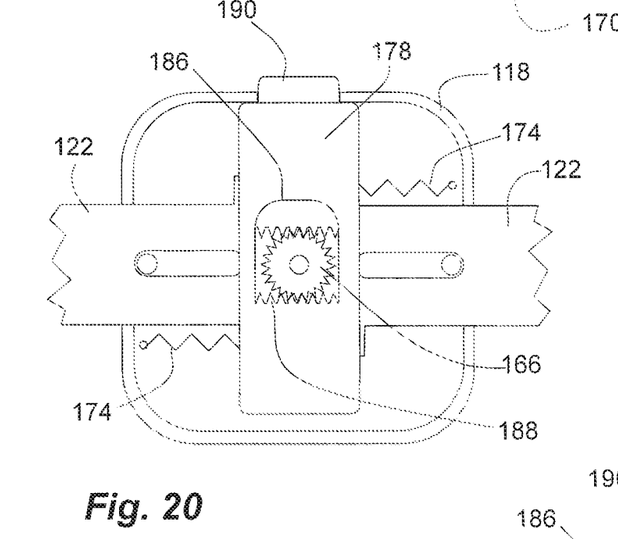
FIG. 20 is a schematic view of the rack and pinion of the pinch grip mount of FIG. 1 shown with a brake in a lock position.
Figure 21:
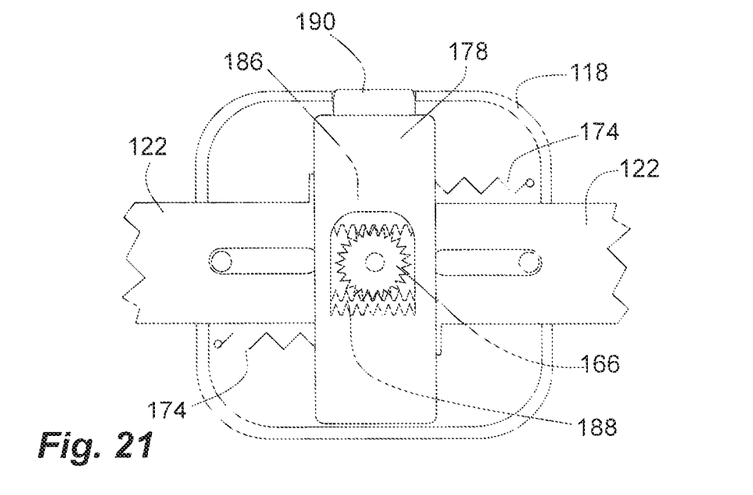
FIG. 21 is a schematic view of the rack and pinion of the pinch grip mount of FIG. 1 shown with the brake in an unlocked position.

Referring to FIGS. 19-21, an interior of the base 118 is shown schematically. The pair of arms 122 can extend from opposite sides of the base 118, and can be selectively movable to adjust a width between the pair of rollers 126 to accommodate different widths of different mobile devices 14. The proximal ends of the arms 122 can be selectively slidable with respect to the base 118 and selectively fixed in position based on the width of the mobile device 14. A rack and pinion can be formed between the pair of arms 122 and the base 118 with a pinion 166 carried by and rotatable with respect to the base 118, and with a pair of racks 170 carried by the proximal ends of the pair of arms 122 and engaging the pinion 166. At least one biasing member, such as a spring 174, can bias the pair of arms 122 inward towards the base 118. A brake 178 can be movably carried by the base 118. The brake 178 has a plate 182 with an aperture 186 therein receiving the pinion 166. In addition, the brake 178 and the plate 182 has teeth 188 in the aperture 186 that engage the pinion 166 in a locked position. Furthermore, the brake 178 and the plate 182 have a tab 190 extending from the base 118 to allow displacement of the plate 182 between locked and unlocked positions. The plate 182 and the brake 178 can be biased in the locked position, such as with a spring. The brake 178 and the plate 182 are displaceable between locked and unlocked positions. In the unlocked position (FIG. 21), the brake 182 disengages the pinion 166, the teeth 188 are displaced away from the pinion 166, and the pinion 166 is free of the brake 178 and the teeth 188 thereof; thus allowing the pair of arms 122 to displace inwardly and outwardly. In the lock position (FIG. 20), the brake 178 engages the pinion 166, the teeth 188 are displaced towards the pinion 166, to resist the pinion 166, and thus the pair of arms 122, from moving.

In use, the mobile device 14 is selectively and removably positioned between the pair of arms 122. Referring to FIG. 18, the mobile device 14 is pressed against the pair of rollers 126 causing the pair of rollers 126 to displace to the wider position, as shown in phantom lines. The mobile device 14 is positioned between the pair of arms 122 and the pair of arms 122 is allowed to displace to the narrow position, as shown in solid lines. The tacky surface 158 of the pair of opposing pads 130 cling to opposite lateral sides of the mobile device 14. The distal ends of the pair of arms 122 squeeze the mobile device 14 therebetween.

Figure 22:
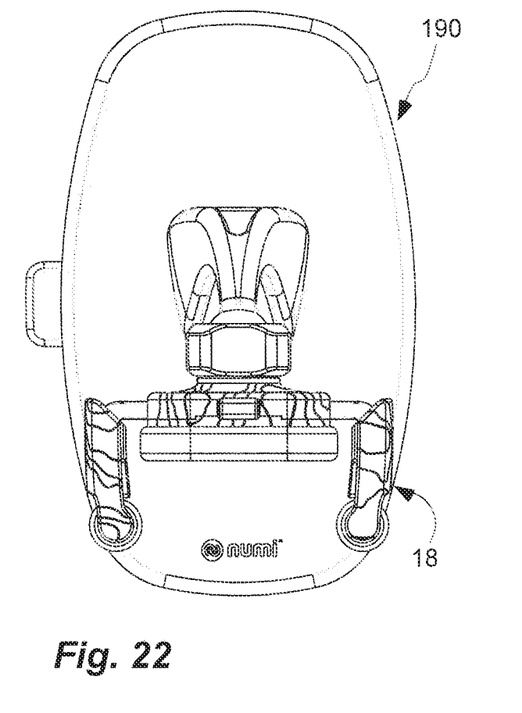
FIG. 22 is a top view of the pinch grip mount of FIG. 1 and a dash mount in accordance with an embodiment of the invention.
Figure 23:
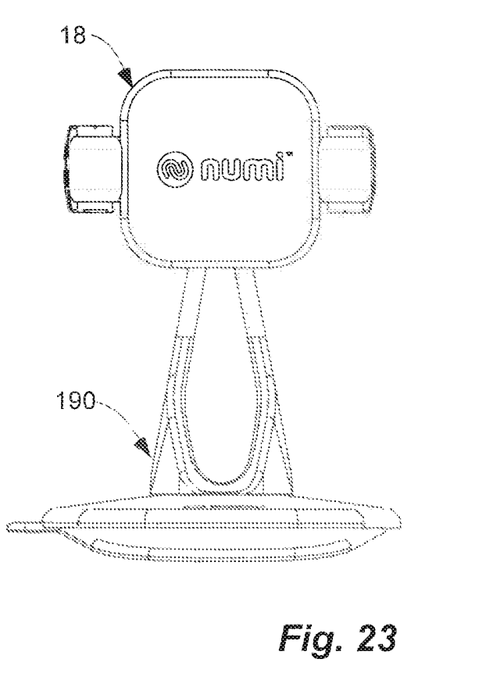
FIG. 23 is a front view of the pinch grip mount and the dash mount of FIG. 22.
Figure 24:
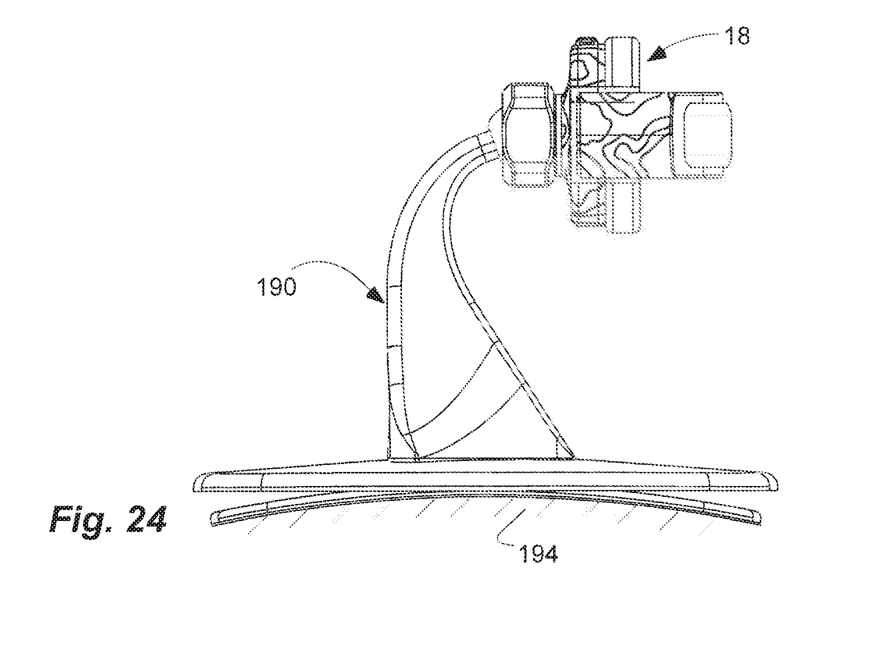
FIG. 24 is a side view of the pinch grip mount and the dash mount of FIG. 22.
Figure 25:
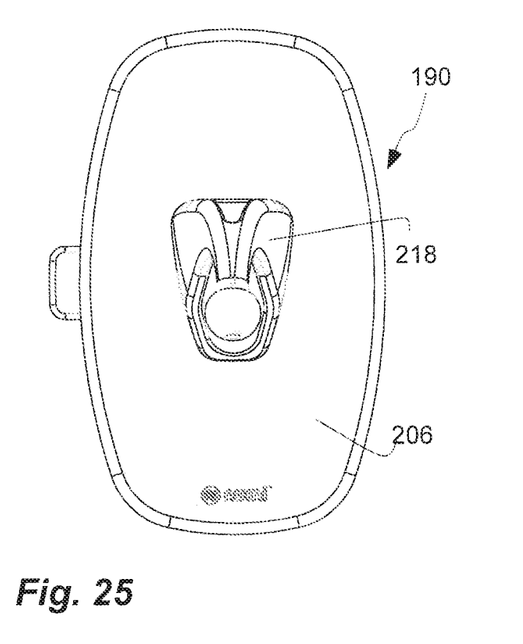
FIG. 25 is a top view of the dash mount of FIG. 22.

As described above, the pinch grip mount 18 can be mounted to the vent clip mount 22, and the mobile device 14 can be mounted with respect to the vehicle air vent 90. In another aspect, the mobile device 14 can be mounted with respect to another support surface, such as a vehicle dashboard or consul. Referring to FIGS. 22-24, the pinch grip mount 18 can be mounted to a dash mount 190 to secure the pinch-grip mount 18 and the mobile device 10 with respect a dashboard 194 of a vehicle.

Figure 26:
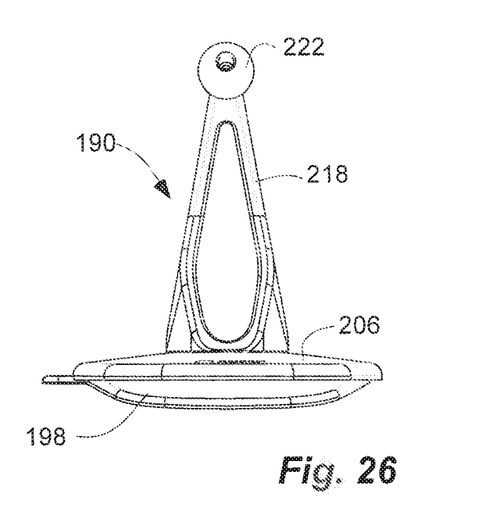
FIG. 26 is a front view of the dash mount of FIG. 22.
Figure 27:
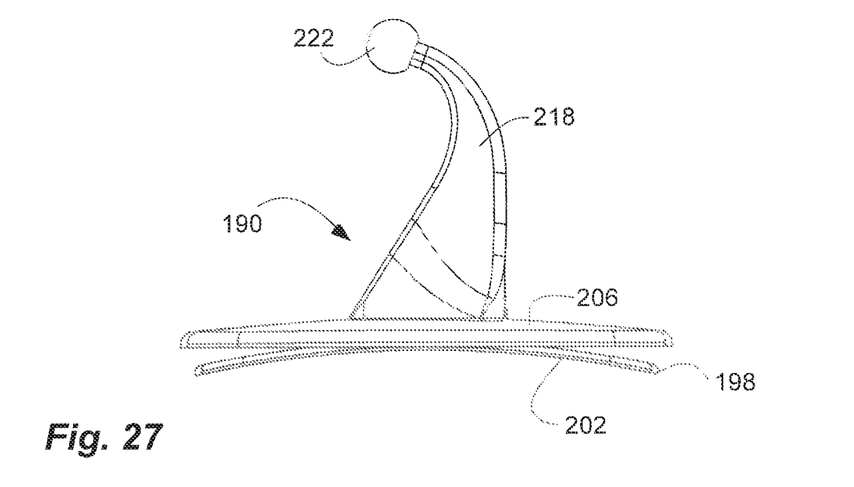
FIG. 27 is a side view of the dash mount of FIG. 22.
Figure 28:
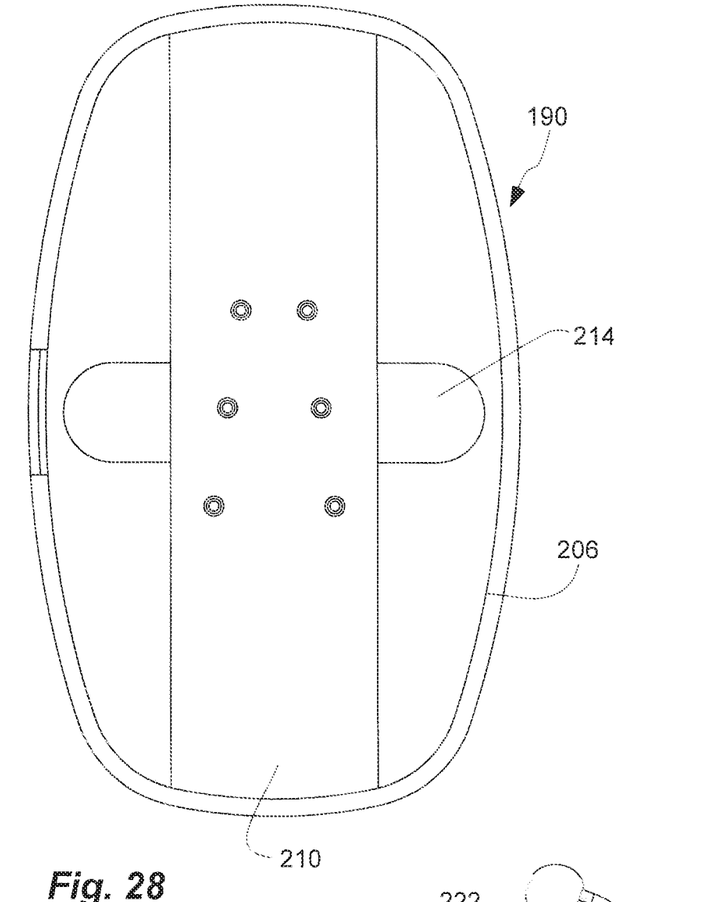
FIG. 28 is a bottom view of the dash mount of FIG. 22 shown with a flexible pad removed to reveal a flexible cap with a deformable member.
Figure 29:
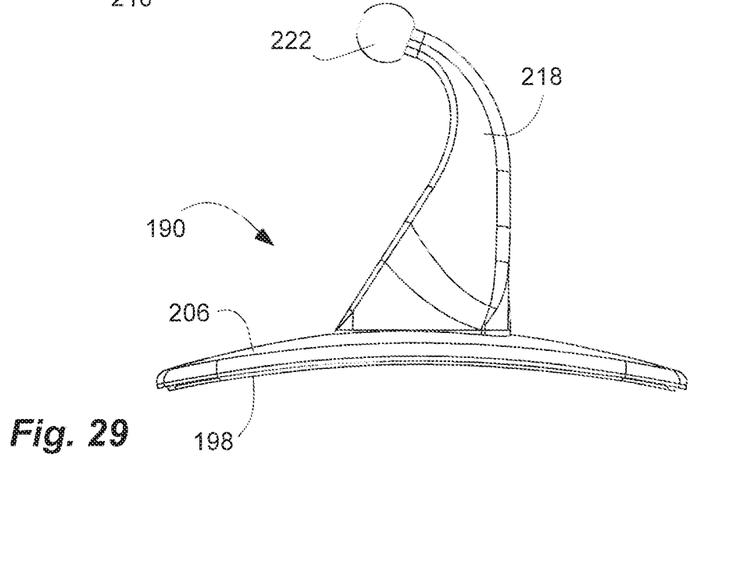
FIG. 29 is a side view of the dash mount of FIG. 22.

Referring to FIGS. 25-29, the dash mount 190 comprises a flexible pad 198 having a bottom surface 202 that is tacky. The tacky bottom surface 202 of the flexible pad 198 can cling to the dashboard 194. In addition, the flexible pad 198 is flexible and can conform to a profile of the dashboard 194. A flexible cap 206 is positioned over the flexible pad 198 with a deformable member 210 (FIG. 28). The flexible cap 206 and the deformable member 210 can be less flexible than the flexible pad 198. Thus, while the flexible pad 198 can readily deform to match the profile of the dashboard 194, the flexible cap 206 and/or the deformable member 210 are physically deformed by an applied force to match the profile of the dashboard 194. Thus, the flexible cap 206 and/or the deformable member 210 can maintain contact between the tacky bottom surface 202 of the flexible pad 198 and the dashboard 194. In one aspect, only a center portion of the flexible pad 198 can be secured to the flexible cap 206 so that a perimeter and opposite ends of the flexible pad 198 can move independently of the flexible cap 206 and the deformable member 210, as shown in FIGS. 26 and 27, to facilitate installation of the dash mount 190 on the dashboard 194. An attachment, such as screws and/or adhesive indicated at 214 in FIG. 28, can attach the flexible pad 198 to the flexible cap 206 at only an interior portion of the flexible pad 198 and the flexible cap 206. The flexible pad 198 can be formed of a tacky material, and can be covered by a covering, such as cloth, to resist clinging to the flexible cap 206. The flexible cap 206 can be formed of a flexible material, such as rubber or the like. The deformable member 210 can be formed of a malleable metal, such as aluminum.

A column 218 can be carried by the flexible cap 206 and can extend from the flexible cap 206. A support 222, such as a ball of a ball and socket joint, can be carried by the column 219 with the pinch-grip mount 18 carried by the support 222. The column 218 and the support 222 can be formed of plastic and can be formed by injection molding.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A pinch-grip mount configured to hold a mobile device with respect to a support surface, the pinch-grip mount comprising:
   a) a base;
   b) a pair of arms movably extending from opposite sides of the base, each arm having a proximal end slidable with respect to the base, a distal end extending transverse with respect to the proximal end at an elbow;
   c) a pair of rollers carried by the pair of arms and located at the distal ends of the pair of arms;
   d) a joint between the proximal and distal ends of each arm having a pivot;
   e) the distal end pivoting with respect to the proximal end about the pivot between:
      i) a wider position with a greater distance between the pair of rollers; and
      ii) a narrow position with a shorter distance between the pair of rollers;

f) a bias member biasing the distal ends of the pair of arms and the pair of rollers to the narrow position;
g) a rack and pinion formed between the pair of arms and the base with a pinion carried by and rotatable with respect to the base, and with a pair of racks carried by the proximal ends of the pair of arms and engaging the pinion;
h) a biasing member biasing the pair of arms inward towards the base; and
i) a brake movably carried by the base and displaceable between:
   A) an unlocked position in which the pinion is free of the brake, and
   B) a lock position in which the brake engages the pinion to resist the pinion, and thus the pair of arms, from moving; and
j) the brake further comprising:
   A) a plate with an aperture therein receiving the pinion;
   B) teeth in the aperture and engaging the pinion in the locked position; and
   C) a tab extending from the base configured to allow displacement of the plate between the locked and unlocked positions.

2. The pinch-grip mount in accordance with claim 1, further comprising:
   a pair of opposing pads carried by distal ends of the pair of arms and having an exterior contact surface;
   the pair of opposing pads comprising a tacky material with the exterior contact surface being a tacky surface; and
   a release liner removably disposed over the exterior contact surface of the pair of opposing pads.

3. The pinch-grip mount in accordance with claim 1, further comprising:
   a pair of opposing pads carried by distal ends of the pair of arms and having an exterior contact surface; and
   the pair of opposing pads being compressible.

4. The pinch-grip mount in accordance with claim 1, further comprising:
   a pair of opposing pads carried by distal ends of the pair of arms and having an exterior contact surface; and
   the pair of opposing pads extending substantially from the pair of rollers to the base.

5. The pinch-grip mount in accordance with claim 1, further comprising:
   a wireless charger carried by the base.

6. The pinch-grip mount in accordance with claim 1 in combination with a mobile device, the pinch-grip mount further comprising:
   a pair of opposing pads carried by distal ends of the pair of arms and having an exterior contact surface;
   the pair of opposing pads comprising a tacky material with the exterior contact surface being a tacky surface;
   the mobile device being positioned between the pair of arms;
   the tacky surface of the pair of opposing pads clinging to opposite lateral sides of the mobile device; and
   the distal ends of the pair of arms squeezing the mobile device therebetween.

7. A method of using the pinch-grip mount in accordance with claim 6, the method comprising:
   pressing the mobile device against the pair of rollers causing the pair of rollers to displace to the wider position; and
   positioning the mobile device between the pair of arms and allowing the pair of arms to displace to the narrow position with the tacky surface of the pair of opposing pads clinging to the mobile device.

8. The pinch-grip mount in accordance with claim 1, further comprising a vent clip mount configured to secure the pinch-grip mount and the mobile device with respect to louvres of a vehicle air vent, the vent clip mount comprising:
   a) a twist key having a shaft with distal and proximal ends and defining an axis;
   b) a head carried at the distal end of the shaft and having a shape with a narrow dimension and a long dimension greater than the narrow dimension and oriented transverse to the narrow dimension;
   c) the twist key being selectively twistable about the axis of the shaft by an angle greater than zero and less than a full turn to selectively orient the head between:
      i) a pass orientation configured to be received between the louvres; and
      ii) a lock orientation configured transverse to the pass orientation and configured to be misaligned with respect to the louvres;
   d) an intermediate plate carried by the shaft and selectively displaceable along the shaft towards the head of the twist key;
   e) a pad carried by the intermediate plate and opposing the head and having: i) a loose position farther from the head, and ii) a tight position closer to the head;
   f) the pad being compressible and capable of having an induced indentation therein via the louvres in the tight position; and
   g) a support carried by the proximal end of the shaft.

9. The pinch-grip mount in accordance with claim 8, the vent clip mount further comprising:
   the shaft having screw threads; and
   a nut carried by the shaft and having screw threads engaging the shaft, the nut being rotatable about the shaft and displaceable along the shaft as the nut rotates, and the nut advancing the plate and the pad along the shaft and configured to press the pad against the louvres of the vehicle vent.

10. The pinch-grip mount in accordance with claim 8, the vent clip mount further comprising:
    a straight line distance parallel with the axis between the head and the pad varying across the pad.

11. The pinch-grip mount in accordance with claim 8, the vent clip mount further comprising:
    the plate having an aperture receiving the shaft therethrough;
    the plate and the nut being separate and distinct from one another and movable with respect to one another.

12. The pinch-grip mount in accordance with claim 8, the vent clip mount further comprising:
    the plate and the shaft being keyed together and twistable together about the axis;
    a tab extending from the plate and aligned with the long dimension of the head and defining an indicator of the orientation of the head.

13. The pinch-grip mount in accordance with claim 12, the vent clip mount further comprising:
    the plate having an aperture receiving the shaft therethrough;
    the shaft having a flat along a lateral side thereof;
    the aperture having a flat therein engaging the flat of the shaft with the plate being displaceable along the shaft without rotating thereon.

14. The pinch-grip mount in accordance with claim 1, further comprising a dash mount configured to secure the pinch-grip mount and the mobile device with respect to a dash of a vehicle, the dash mount comprising:
   a) a flexible pad having a bottom surface that is tacky;
   b) a flexible cap positioned over the flexible pad and having a deformable member, the deformable member being less flexible than the flexible pad;
   c) an attachment attaching the flexible pad to the flexible cap at only an interior portion of the flexible pad and the flexible cap;
   d) a column extending from the flexible cap; and
   e) a support carried by the column and having the pinch-grip mount carried thereby.

15. The pinch-grip mount in accordance with claim 1, further comprising:
   a pair of opposing pads carried by distal ends of the pair of arms and having an exterior contact surface; and
   the pair of opposing pads comprising a tacky material with the exterior contact surface being a tacky surface.

16. A pinch-grip mount configured to hold a mobile device with respect to a support surface, the pinch-grip mount comprising:
   a) a base;
   b) a pair of arms movably extending from opposite sides of the base and having:
      i) a wider position with a greater distance between the pair of arms; and
      ii) a narrow position with a shorter distance between the pair of arms;
   c) a bias member biasing the pair of arms to the narrow position;
   d) a pair of opposing pads carried by the pair of arms and having an exterior contact surface;
   e) a rack and pinion formed between the pair of arms and the base with a pinion carried by and rotatable with respect to the base, and with a pair of racks carried by the proximal ends of the pair of arms and engaging the pinion;
   f) a biasing member biasing the pair of arms inward towards the base; and
   g) a brake movably carried by the base and displaceable between:
      i) an unlocked position in which the pinion is free of the brake, and
      ii) a lock position in which the brake engages the pinion to resist the pinion, and thus the pair of arms, from moving; and
   h) the brake further comprising:
      i) a plate with an aperture therein receiving the pinion;
      ii) teeth in the aperture and engaging the pinion in the locked position; and
      iii) a tab extending from the base configured to allow displacement of the plate between the locked and unlocked positions.

17. The pinch-grip mount in accordance with claim 16, further comprising:
   a) each arm having a proximal end slidable with respect to the base, a distal end extending transverse with respect to the proximal end at an elbow;
   b) a pair of rollers carried by the pair of arms and located at the distal ends of the pair of arms;
   c) a joint between the proximal and distal ends of each arm having a pivot; and
   d) the distal end pivoting with respect to the proximal end about the pivot between the wider and narrow positions.

18. The pinch-grip mount in accordance with claim 16, further comprising:
   a wireless charger carried by the base.

19. The pinch-grip mount in accordance with claim 16, further comprising:
   the pair of opposing pads comprising a tacky material with the exterior contact surface being a tacky surface.

20. A pinch-grip mount configured to hold a mobile device, in combination with a dash mount configured to secure the pinch-grip mount and the mobile device with respect a dashboard of a vehicle, the pinch grip mount comprising:
   a) a base;
   b) a pair of arms movably extending from opposite sides of the base and having:
      i) a wider position with a greater distance between the pair of arms; and
      ii) a narrow position with a shorter distance between the pair of arms;
   c) a bias member biasing the pair of arms to the narrow position; and
   d) a pair of opposing pads carried by the pair of arms and having an exterior contact surface; and
the dash mount comprising:
   a) a flexible pad having a bottom surface that is tacky;
   b) a flexible cap positioned over the flexible pad and having a deformable member, the deformable member being less flexible than the flexible pad;
   c) an attachment attaching the flexible pad to the flexible cap at only an interior portion of the flexible pad and the flexible cap;
   d) a column extending from the flexible cap; and
   e) a support carried by the column and having the pinch-grip mount carried thereby.

21. The pinch-grip mount in accordance with claim 20, further comprising:
   the pair of opposing pads comprising a tacky material with the exterior contact surface being a tacky surface.

* * * * *